(12) United States Patent
Aschen et al.

(10) Patent No.: US 8,205,254 B2
(45) Date of Patent: Jun. 19, 2012

(54) SYSTEM FOR CONTROLLING WRITE ACCESS TO AN LDAP DIRECTORY

(75) Inventors: Sean E. Aschen, Torrington, CT (US); Bahri B. Bali, Cary, NC (US); Catherine Y. Barnes, Mansfield, PA (US); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 12/145,107

(22) Filed: Jun. 24, 2008

(65) Prior Publication Data

US 2008/0282359 A1    Nov. 13, 2008

Related U.S. Application Data

(63) Continuation-in-part of application No. 10/850,115, filed on May 20, 2004, now Pat. No. 7,530,111.

(51) Int. Cl.
*H04L 29/06* (2006.01)
(52) U.S. Cl. .............................. 726/21; 726/27
(58) Field of Classification Search .................. None
See application file for complete search history.

(56) References Cited

U.S. PATENT DOCUMENTS

| | | | |
|---|---|---|---|
| 1,361,501 A | 12/1920 | Schepmoes | |
| 1,946,690 A | 2/1934 | Haines | |
| 2,142,305 A | 1/1939 | Davis | |
| 2,914,109 A | 11/1959 | Hsu et al. | |
| 2,928,124 A | 3/1960 | Hugger | |
| 2,946,713 A | 7/1960 | Dusina, Jr. et al. | |
| 3,362,266 A | 1/1968 | Krafft | |
| 3,387,330 A | 6/1968 | Lemelson | |
| 3,741,851 A | 6/1973 | Erb et al. | |
| 3,936,624 A | 2/1976 | Andersen et al. | |
| 4,076,867 A | 2/1978 | Lewicki et al. | |
| 4,091,154 A | 5/1978 | Hirai | |
| 4,620,892 A | 11/1986 | Dodson et al. | |
| 4,844,850 A | 7/1989 | Harder | |
| 5,215,811 A | 6/1993 | Reafler et al. | |
| 5,677,851 A | 10/1997 | Kingdon et al. | |
| 5,827,592 A | 10/1998 | Van Gulik et al. | |
| 6,141,759 A | 10/2000 | Braddy | |
| 6,345,266 B1 | 2/2002 | Ganguly et al. | |
| 6,558,799 B2 | 5/2003 | Takeuchi et al. | |
| 6,581,093 B1 | 6/2003 | Verma | |
| 6,654,891 B1 | 11/2003 | Borsato et al. | |

(Continued)

OTHER PUBLICATIONS

U.S. Appl. No. 10/181,987, filed Feb. 1912, Philpot, et al.

*Primary Examiner* — Gilberto Barron, Jr.
*Assistant Examiner* — David Le
(74) *Attorney, Agent, or Firm* — John Pivnichny; Roberts Mlotkowski Safran & Cole, P.C.

(57) ABSTRACT

A method is provided to control access to a software application and, more particularly, to control access to a first software application using a second trusted application. The method comprises extracting data from a decrypted client request and determining a request type from the extracted data. The method further comprises ascertaining an entry type value from at least one of the extracted data and an entry and creating at least one string by prepending the entry type value to one or more attributes associated with the entry. Additionally, the method includes comparing the at least one string to one or more record entries to determine whether a client has permission to perform the request type.

24 Claims, 7 Drawing Sheets

U.S. PATENT DOCUMENTS

| | | |
|---|---|---|
| 6,665,674 B1 | 12/2003 | Buchanan et al. |
| 6,769,011 B1 | 7/2004 | Desrochers et al. |
| 7,133,833 B1 | 11/2006 | Chone et al. |
| 7,213,150 B1 | 5/2007 | Jain |
| 7,496,637 B2 * | 2/2009 | Han et al. .................. 709/217 |
| 2002/0032684 A1 * | 3/2002 | Kobayashi et al. ........... 707/100 |
| 2002/0083340 A1 | 6/2002 | Eggebraaten et al. |
| 2002/0087476 A1 * | 7/2002 | Salas et al. .................... 705/59 |
| 2002/0178026 A1 | 11/2002 | Robertson et al. |
| 2002/0186260 A1 | 12/2002 | Young |
| 2003/0033349 A1 | 2/2003 | Lambert et al. |
| 2003/0191757 A1 * | 10/2003 | Ambrosini et al. ............... 707/3 |
| 2003/0200448 A1 * | 10/2003 | Foster et al. .................. 713/189 |
| 2004/0059719 A1 | 3/2004 | Gupta et al. |
| 2005/0033795 A1 * | 2/2005 | Wood ............................ 709/200 |
| 2005/0080886 A1 | 4/2005 | Croy et al. |
| 2005/0198501 A1 | 9/2005 | Andreev et al. |
| 2006/0147043 A1 | 7/2006 | Mann et al. |

* cited by examiner

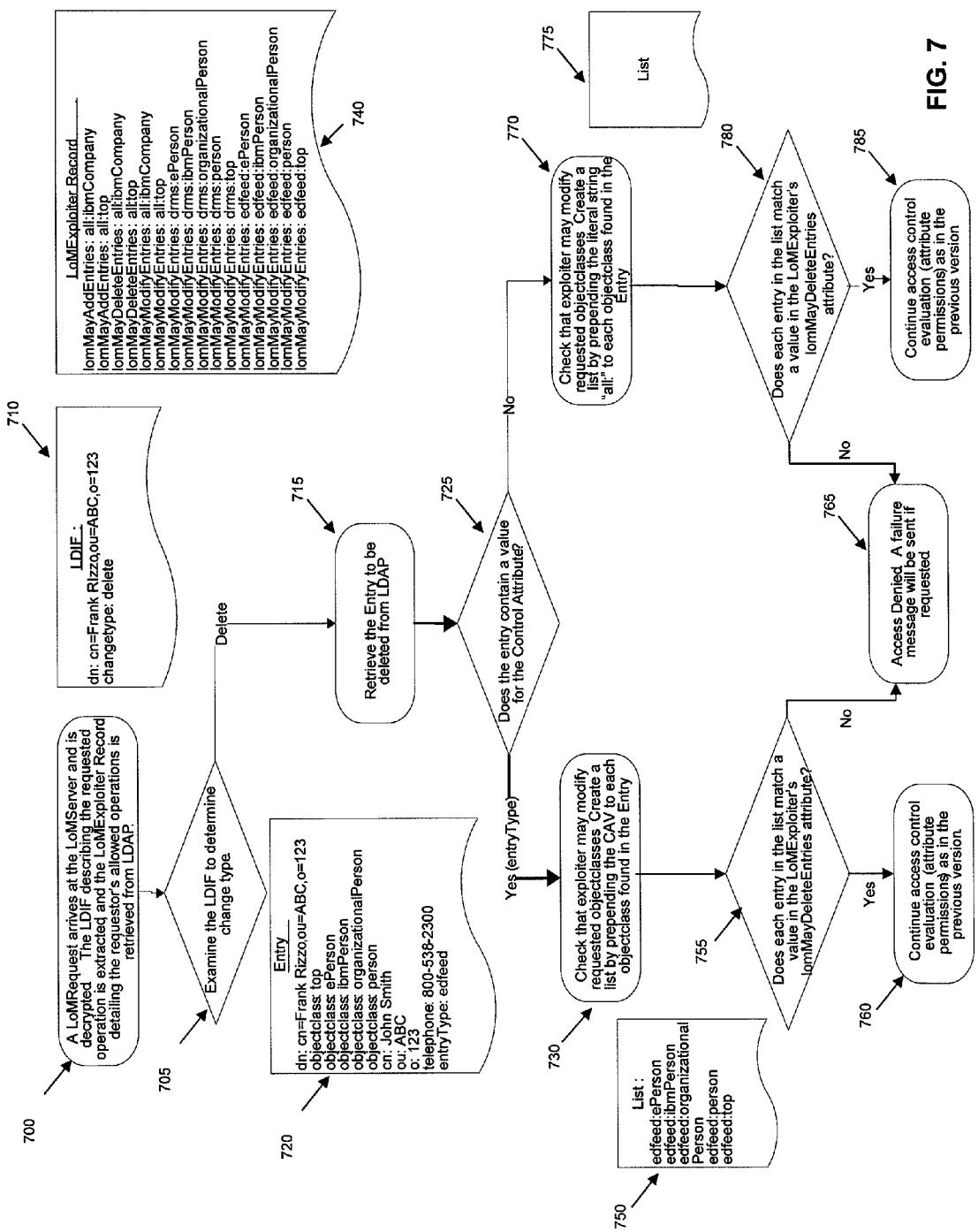

SYSTEM FOR CONTROLLING WRITE ACCESS TO AN LDAP DIRECTORY

CROSS REFERENCE TO RELATED APPLICATIONS

The present application is a continuation-in-part application of application Ser. No. 10/850,115, filed on May 20, 2004, the contents of which are incorporated by reference in their entirety herein.

BACKGROUND OF THE INVENTION

1. Field of the Invention

The invention generally relates to controlling access to a software application and, more particularly, controlling access to a first software application using a second trusted application.

2. Background

When deploying servers (e.g., lightweight directory access protocol (LDAP) directories) in large enterprises, efficient write-access and update management become major issues. For example, in a network enterprise system, LDAP control implementations typically require that an Access Control List (ACL) for an entry be stored in that entry. The single LDAP master directory handles receiving and propagating all changes and propagating them to replica servers. LDAP master servers typically handle write requests, and replica servers typically handle read requests. In a LDAP directory with a large audience, this may result in the ACLs consuming more space than the actual data. This increase in data and the processing of the ACLs reduces the speed at which the LDAP master can process updates which, in turn, exacerbates response time and overall speed of processing. In certain situations the LDAP master becomes so busy processing incoming change requests that propagation of the changes to replicas is impacted. To accommodate processing requests, LDAP products have access control mechanisms, but they are typically very fine-grained and tend to be susceptible to overall performance degradation as demands increase. As entries in the master LDAP directory increase, performance and response times degrade.

Access to ACL lists is typically restricted to certain users or applications. Thus, granting individual users access to the ACL list is uncommon. However, if users are granted the ability to update their own data in the ACL, an ACL for the owner for each entry would have to be created. For example, if there are currently 350,000 entries, allowing each user to update their own data would necessitate doubling the number of entries in the directory, in this example, to 700,000 entries. This would create undesired overhead on the LDAP directory processing.

Thus, granting users the ability to update their own data in an ACL, for example, to permit a user the ability to update for example, phone/FAX/tieline data, may create undesirable impediments to ACL processing. However, if a solution may be implemented to avoid this undesired overhead on the master LDAP server, then updates to user data by users may be performed without undue performance degradation.

Additionally, current LDAP masters typically service all requests for ACL updates, regardless of the requestor's identity or type of modification being performed on the ACL. Authentication of the requester and validating the entitlement of the requestor before permitting access to the ACL must be performed for every request. The function of validating entitlement and authenticating the requester is a significant overhead task that is built into the traditional functions of the LDAP master which contributes to slow response times and unacceptable performance issues. Therefore, allowing increased numbers of users access to the ACL list significantly increases overhead since their accesses must also be authenticated and entitlement validated. Further, updates to a LDAP directory are typically a synchronous operation and if the attempt fails, retries are necessary to complete the update. These updates may involve significant complexity or overhead.

SUMMARY

In an aspect of the invention the invention includes a method of processing requests, the method comprises: extracting data from a decrypted client request; determining a request type from the extracted data; ascertaining an entry type value from at least one of the extracted data and an entry; creating at least one string by prepending the entry type value to one or more attributes associated with the entry; and comparing the at least one string to one or more record entries to determine whether a client has permission to perform the request type.

Another aspect of the invention includes a computer program product comprising a computer usable medium having readable program code embodied in the medium, the computer program product includes at least one component to: extract data from a decrypted request; determine a change type from the decrypted data; retrieve an entry type value; determine whether the entry type value is typed or non-typed; and check if authorization exists to perform the change type.

In yet another aspect of the invention, a method for deploying an application for processing requests, comprises providing a computer infrastructure being operable to: extract data from a decrypted client request; determine a request type from the extracted data; ascertain an entry type value from at least one of the extracted data and an entry; create at least one string by prepending the entry type value to one or more attributes associated with the entry; and compare the at least one string to one or more record entries to determine whether a client has permission to perform the request type.

BRIEF DESCRIPTION OF THE SEVERAL VIEWS OF THE DRAWINGS

FIG. 7 is a flow chart of steps of an embodiment of the invention.

DETAILED DESCRIPTION

Figure 1:
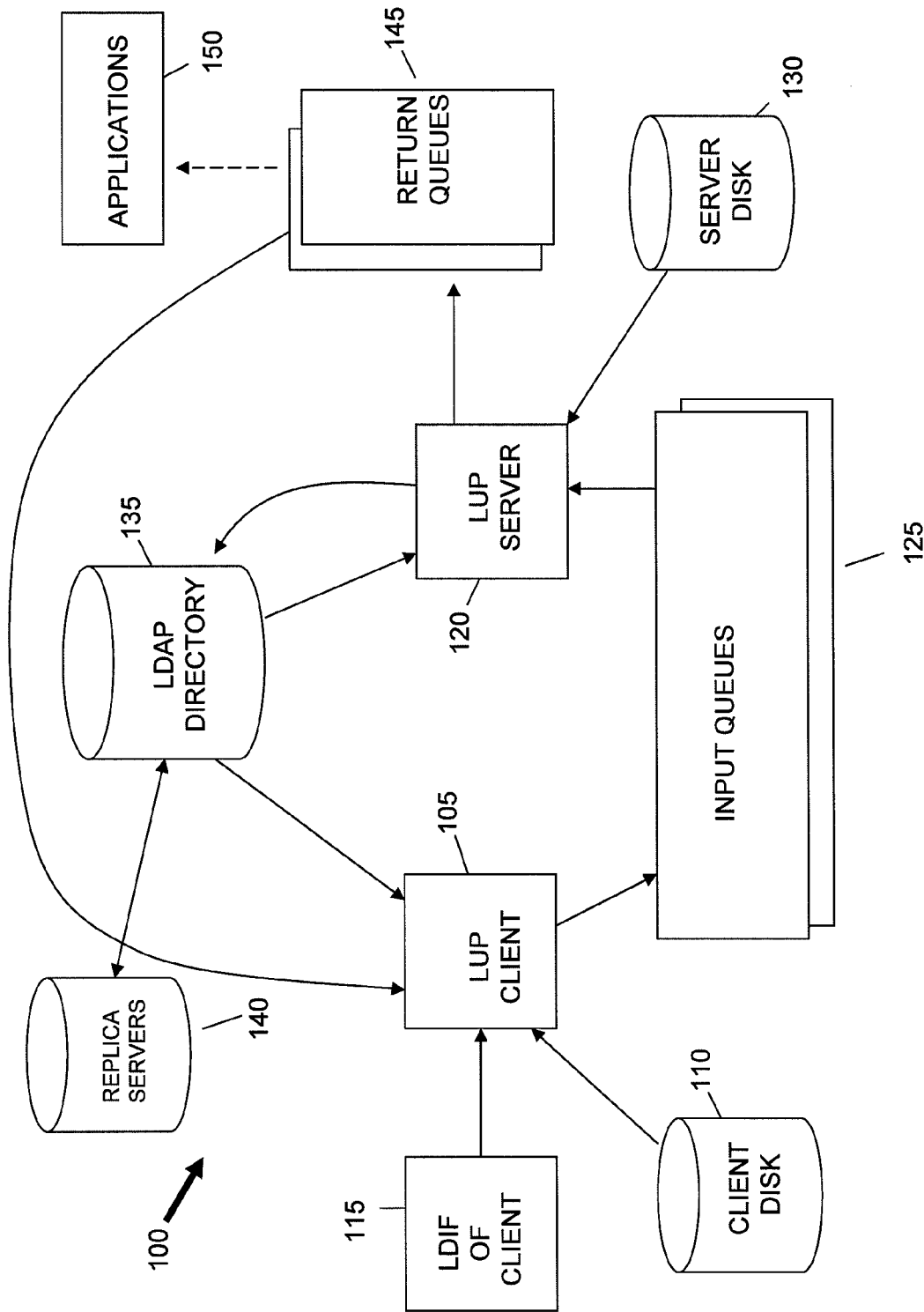
FIG. 1 is a block diagram of an embodiment of the invention.

This invention is directed to a system and method for controlling access to a first software application using a second software application. The second software application is trusted by the first application. When one application trusts another it typically means that the encryption sub-system of one application has a copy of the public key of a second application which allows the first application to decrypt messages, or the like, sent by the second application. For example, lightweight directory access protocol (LDAP) requests may be intercepted and authentication and entitlement checks are performed at a LDAP proxy server prior to applying the LDAP requests to a LDAP directory. This offloading of certain functions significantly reduces the overall processing overhead on the master LDAP directory server.

Embodiments of the Disclosure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of an embodiment of the invention, generally denoted by reference numeral 100. The components of the invention comprise a LDAP Update Proxy (LUP) client 105 that may issue requests to update/modify LDAP entries, and may include a client disk 110 for storing client data which may be maintained in a database. The invention also comprises generally well known Lightweight Directory Interchange Format (LDIF) data 115 which may be created by the LUP client 105 when requesting an update to the LUP client's LDAP entries, a LUP server 120 for processing LDAP requests and communicates with the master LDAP directory 135 which may include a server disk 130. The master LDAP directory 135 maintains LDAP data and propagates changes to replica servers 140, and return queues 145 for queuing any replies to LUP clients 105. The invention further comprises input queues 125 for receiving and queuing one or more LDAP requests from one or more LUP clients 105. In embodiments, business area level applications 150 may also be notified by a return queue 145 of any updates to LDAP data when a LUP client 105 makes a change.

Figure 2:
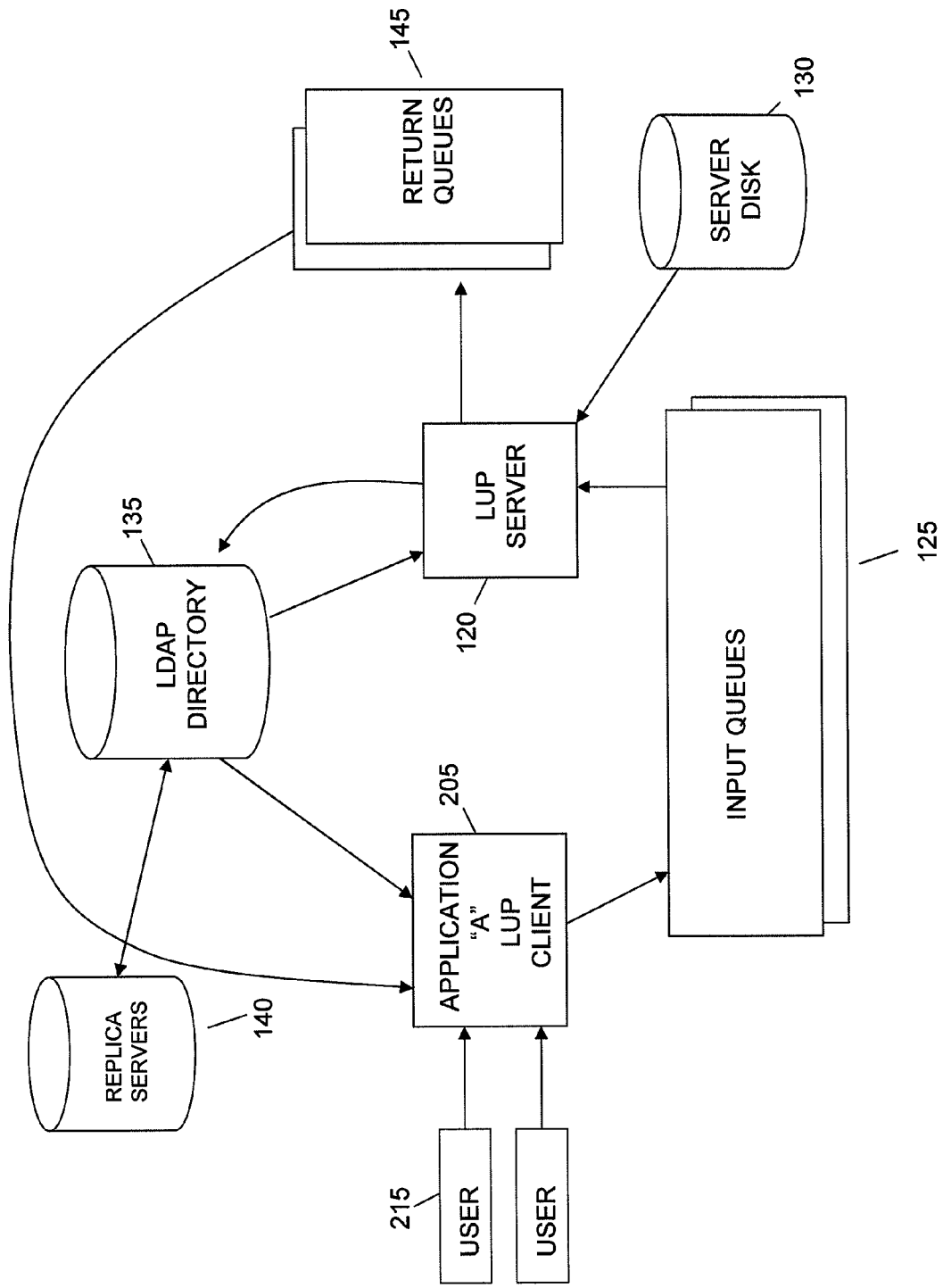
FIG. 2 is a block diagram of an embodiment of the invention.

FIG. 2 is a block diagram of a further embodiment of the invention. This embodiment provides for application level (or "business area" level) access control. That is, instead of each user 215 having the authority to update (i.e., write) their own data (e.g., phone/fax/tie line data, or the like), the invention provides for a proxy application 205 to update user data or user profile (e.g., phone/fax/tie line, or the like). In this embodiment, proxy application 205 actually updates the LDAP data on behalf of the user by generating appropriate LDIF data. In this manner, the proxy application 205 is responsible for supplying authentication/authorization when a requesting user 215 attempts to actually update their own data (or has appropriate access, e.g., when a manager updates data for others). The proxy application 205 typically is an application that is well trusted. There are many applications such as, for example, human resources, financial records, accounting, or any application where logical or physical user groups may be present, that might use the proxy application mechanism to perform LDAP updates. In embodiments, the proxy application 205 may actual be incorporated as part of the LUP server 120.

Being more specific, when a LUP client 105 or application proxy 205 issues a request to update LDAP data, the request is queued at one or more input queues 125. The LUP client 105 or application proxy 205 may use a public key of the LUP server to encrypt the request which includes LDIF data relevant to the request and may be digitally signed using the LUP client's or application proxy's private key. The LUP server 120 reads the input queue 125 and determines the identity of the client (e.g., 105 or 205). The LUP server 120 then uses public key encryption to authenticate users who place data in the input queues 125. The LUP server 120 accesses the client's (e.g., 105 or 205) public key (which may be stored on the server disk 130) and verifies the digital signature. If the verification is successful, then the LUP server 120 decrypts the client's request using the client's (e.g., 105 or 205) private key. The LUP server 120 may then check whether the client (e.g., 105 or 205) is authorized to make the requested LDAP changes. If the client has authority, then the LUP server 120 applies the LDIF to the LDAP directory 135.

The LDAP directory has it's own internal access control system which allows users to connect to the directory as different users with different access privileges. This allows for very fine grained control over who may do what to the directory, but it severely reduces the speed at which requests are processed. Traditionally, the various users and their passwords are defined in the directory, and then it is decided what operations may be performed to which entries by which users. This requires storing ownership and access information in each entry for each user. Not only is the overhead in computation time to determine if a user is allowed to perform an operation, but this scheme also inflates the directory size which makes all operations take longer. By disabling this access control system in accordance with the invention, the directory response time improves by an order of magnitude. Security and granular access control is still required in an enterprise directory, so a new access control scheme has been devised which operates outside of the directory server. Since this other application has root access to the directory, it must be kept secure.

When the LUP server 120 applies updates to the master LDAP directory 135, the changes may be made using the root-id of the LDAP master with appropriate password. This requires that the LUP server 120 is a trusted application. This access is much faster than a typical access to a master LDAP directory since the authentication and entitlement checks may no longer be necessarily performed by the master LDAP directory 135 server but rather by the LUP proxy 120. This significantly improves overall performance at the LDAP master. Each change requestor has an entry in a sub-tree of the LDAP directory. This entry contains lists of items the requestor may add, delete or modify which the LUP proxy enforces.

When the LDIF data is applied to the master LDAP directory 135, a notification may be returned via return queues 145 to the LUP client 105 or application proxy 205 as appropriate. This return notification is typically encrypted in the same fashion as incoming changes. Additionally, a notice may be placed in the return queues 145 to notify associated or pre-designated applications 150 of the LDAP changes in order to provide LDAP update notifications that occur by client or user.

The relationship of the LUP 120 to the master LDAP directory 135 changes LDAP updates from a traditionally synchronous operation to an asynchronous operation. The relationship now permits additional processing time for the LDAP master to propagate changes to the replica servers 140 since the authentication and entitlement checks are now performed by the LUP server 120. This relationship may substantially eliminate the LDAP master from becoming too busy accumulating incoming changes. The LUP server 120, incoming queues 125, and return queues 145 also provide substantial timing elasticity to smooth spikes in the master LDAP directory 135 processing by accepting requests asynchronously and holding the requests in the incoming queues until the master LDAP directory 135 is able to accept the requests when processing demands more favorably permit acceptance, and similarly, the return queues also permit asynchronous timing for returning the replies to requestors or other applications.

A client now places a request on the persistent input queues 125 and waits for a reply from the return queues 145. Additionally, if the master LDAP directory is down or impaired (e.g., crash, power outage, maintenance, etc.), the requests remain pending until they can be processed, even for extended periods. The queuing mechanisms substantially eliminate excessive client retries since requests remain pending until they can be processed.

Figure 3:
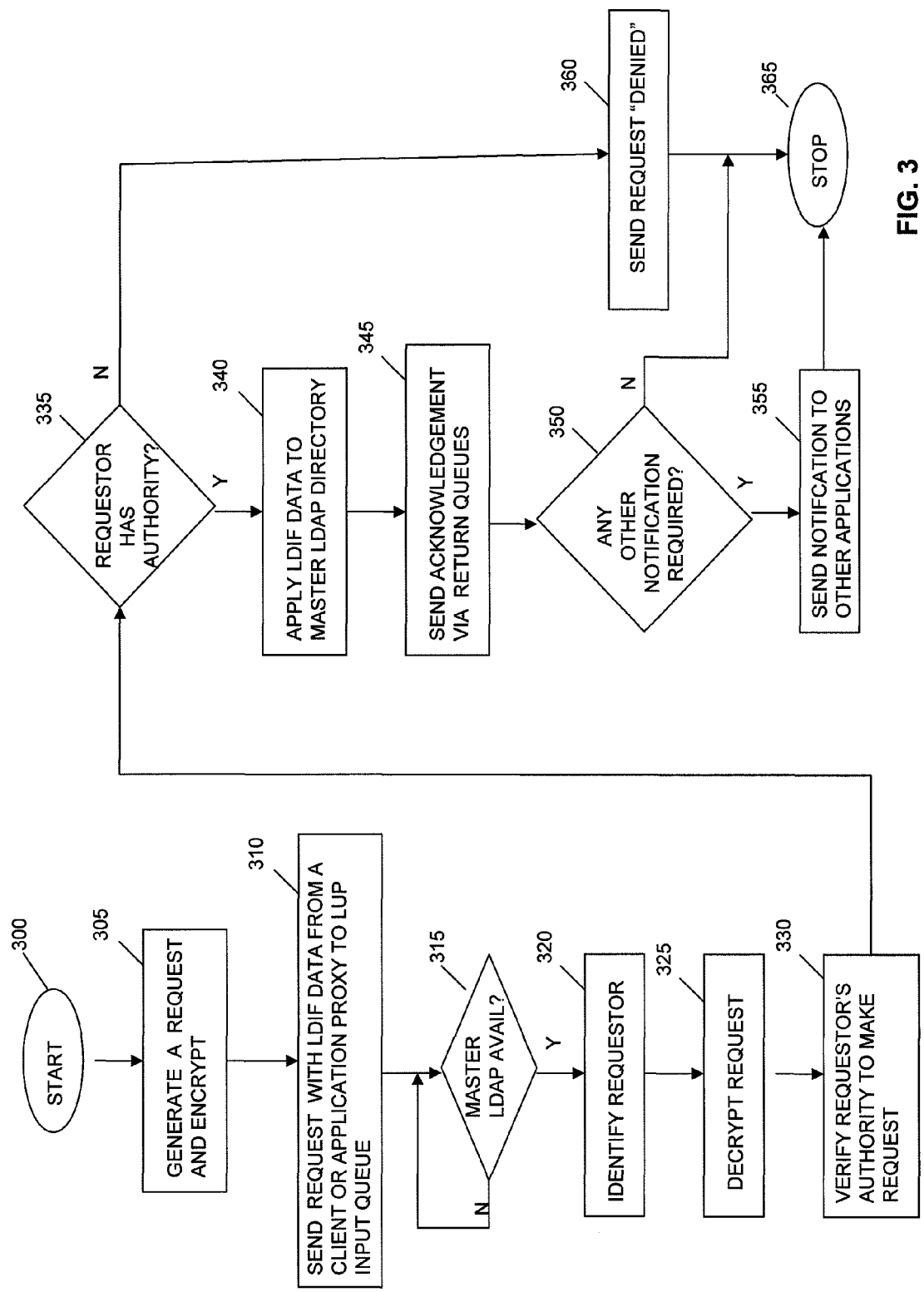
FIG. 3 is a flow chart of steps of an embodiment of the invention.

FIG. 3 is a flow diagram showing steps of an embodiment of the invention, beginning at 300. FIG. 3 may equally represent a high-level block diagram of components of the invention implementing the steps thereof. The steps of FIG. 3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Continuing with FIG. 3, at step 305, a client or proxy application generates and encrypts a LDAP request to change or update a user profile. The request may contain LDIF data to accomplish the update. At step 310, the request with LDIF data from the client or application proxy is sent to a LUP input queue. At step 315, a check is made whether the master LDAP directory is available (e.g., on-line) and if not, the request remains queued until the LDAP master becomes available. At step 320, the LUP server de-queues the request and identifies the requester of the request from information contained with the request, such as, for example, originating client, originating user-id, originating application id, originating network address, etc. At step 325, the request is decrypted using public keying mechanisms. At step 330, the LUP server verifies the requestor's authority to make a request, typically by checking the ACL of the appropriate LDAP directory entry.

At step 335, a decision is made whether the requestor has authority to make the request and, if not, then at step 360, a request denied message is returned to the requestor and the process stops at step 365. However, if the requestor has authority to make a request then, at step 340, the LUP server applies the LDIF data to the master LDAP directory using the root-id and associated password to effect the update. At step 345, a successful acknowledgement of the update is returned to the requestor via the return queues. At step 350, a check is made whether any other notification must be sent, for example, to notify associated applications making them aware of the successful request or the effect of the request. If no other notification is needed, then, at step 365, the process ends. However, if other notifications are necessary, then, at step 355, notifications are sent to the appropriate applications indicating the update to the LDAP directory. At step 365, the process ends.

The invention provides increased efficiencies (e.g. processing overhead, database sizing, availability, and the like) to a first software application (e.g., LDAP directory) by freeing the first software application from processing functions that may be performed by a second trusted software application. The second software application acts as a proxy and accepts requests for accessing the first software application (e.g., users, clients, and application programs), and validates the request by verifying identity of the requestor and establishing entitlement rights of the requestor). The contribution of the second application creates substantial improvement to the first software applications by reducing its overall burden. The use of queuing structures also provides for asynchronous and time flexible communication mechanisms between the requesters, proxy, first application, and to other applications as warranted.

Figure 4:
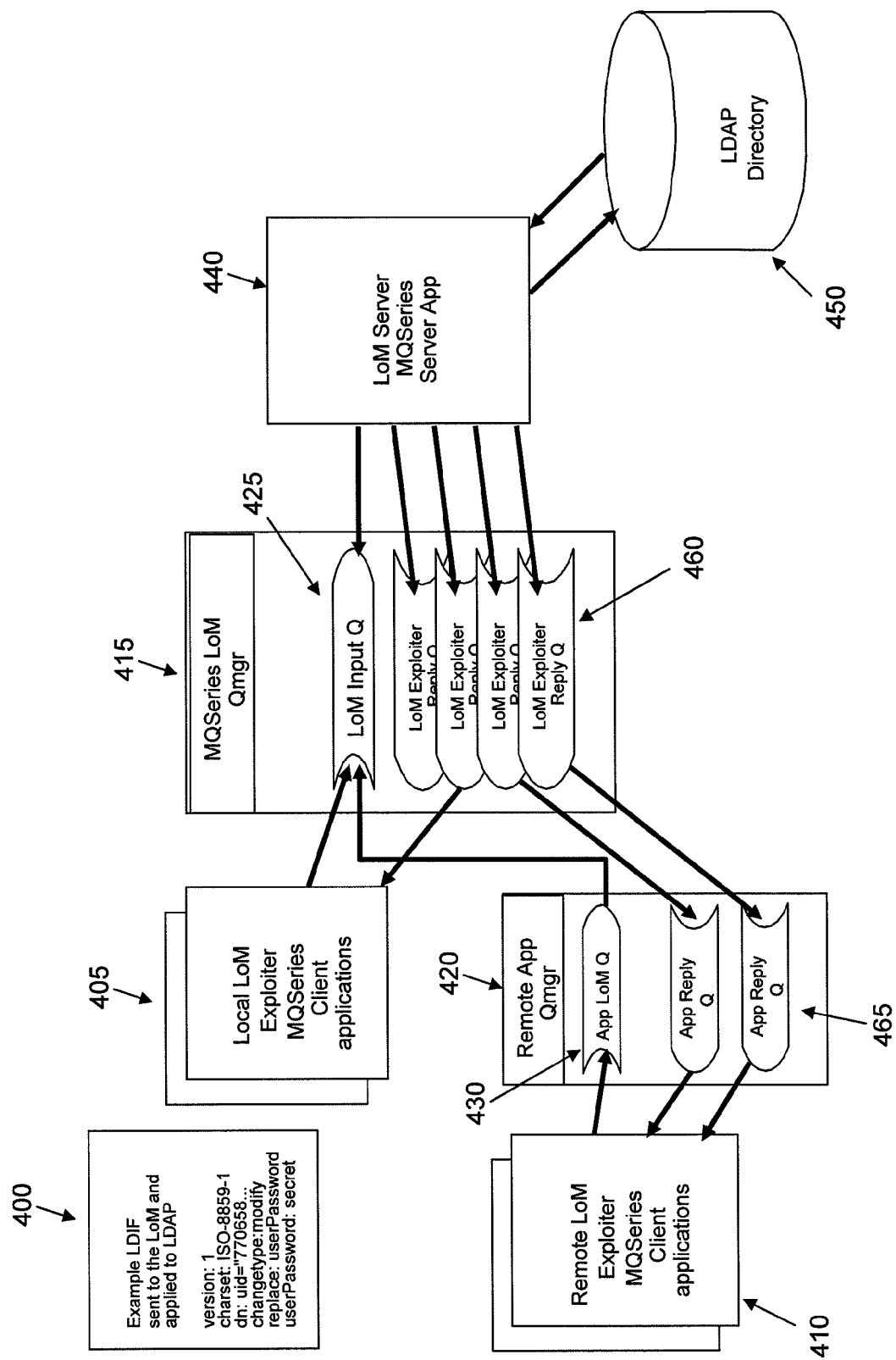
FIG. 4 is a block diagram of an embodiment of the invention.

FIG. 4 is block diagram of an embodiment of the invention. FIG. 4 includes LDIF data 400 that that can be sent to a LDAP server by a MQSeries (LoM) Exploiter client 405. More specifically, the LoM Exploiter client 405 may be used to send request messages to a MQSeries LoM queue manager (Qmgr) 415. Once received, the Qmgr 415 can queue the request messages using one or more LoM input queues 425. In embodiments, the LoM Exploiter client 405 may be an LUP client and the Qmgr 415 may be an input queue.

A LoM server MQSeries server application (LoM server) 440 may be used to retrieve LoM request messages from the LoM input queues 425. In embodiments the LoM server 440 may be a LUP server. The LoM server 440 may retrieve the request message serially in an asynchronous manner, such that the request messages are held in the LoM input queue 425 until a LDAP directory 450 is able to accept the requests. Once the request message is retrieved, details as to the identity of the LoM Exploiter client sending the request may be determined and the LoM server 440 may pull a LoM Exploiter client's 405 public key from a LoM Exploiter record in the LDAP directory 450. In embodiments, this may be performed by using an exploiter DN, which can be defined in the incoming request message.

Upon obtaining the LoM Exploiter client's public key, the LoM server 440 is configured to decrypt the request message and extract LDIF data 400, which describes the requested operation, from the LoM Exploiter record. The LoM Exploiter record may include details on what operations a LoM Exploiter client 405 is allowed to perform and may, e.g., define one or more attributes that the LoM Exploiter client 405 can access. The LoM Exploiter record may also define the request types that may be performed by the LoM Exploiter client 405.

The LoM server 440 may perform a check on the LDIF data 400 to determine the request type associated with the message. Exemplary request types include adding, deleting, and/or modifying LDIF data 400. Once a request type is determined, an entry can be retrieved from the LDAP directory 450 and an examination of the entry's attributes can be performed by the LoM server 440 to determine whether the LoM Exploiter client 405 has permission to perform the request type. The process of determining whether the LoM Exploiter client 405 has adequate permissions may include an examination to determine whether the entry is a typed entry or a non-typed entry. Typed entries have a value for their entry type; whereas, non-typed entries have no value for their entry type.

Each entry may include one or more objectClasses. For each objectClass found in the entry, an entry type may be prepended to the objectClass using a colon (':'). In embodiments, an entry type is synonymous with a control attribute value. Thus, if an object class is "ePerson" and an entry type is "drms", the newly created string would be, e.g., "drms:ePerson". The newly created string or strings may be compared against attribute values in the LoM Exploiter record that correspond to the request type that is associated with the request message. If all of the strings are found, the LoM server 440 will apply the request type that is associated with the LDIF data 400 to the entry. Thus, a person sending a request message to delete an entry will only be able to delete the entry if the person has access control or permission to do so, i.e., if all of the strings are in the LoM Exploiter record. If one or more of the strings are not found, the person does not have permission and the type of request will not be applied to the entry.

A reply message may be sent by the LoM server 440 to the Qmgr 415. In embodiments, the reply message may be sent directly to a LoM Exploiter reply queue 460. The reply message may include, e.g., a confirmation that the request type has been performed or denied as well as any errors that may have occurred. The LoM Exploiter reply queue 460 may pass the reply request to the LoM Exploiter client 405.

Depending on the network topology, a remote LoM Exploiter client 410 may be used to send requests to one or more remote application queue managers (remote Qmgr) 420. The remote Qmgr 420 may subsequently send the request to one or more Qmgrs 415. Similarly, reply messages sent to a LoM Exploiter reply queue 460 may be transferred to an application reply queue 465 and passed to a remote LoM Exploiter client 410.

While a MQSeries product has been used to describe FIG. 4, it should be understood that embodiments may employ any number of systems to handle messaging across one or more platforms. For example, a first communication product may be used by a remote Qmgr 465 and a MQSeries product may be used for Qmgr 415.

Exemplary Modification

Figure 5:
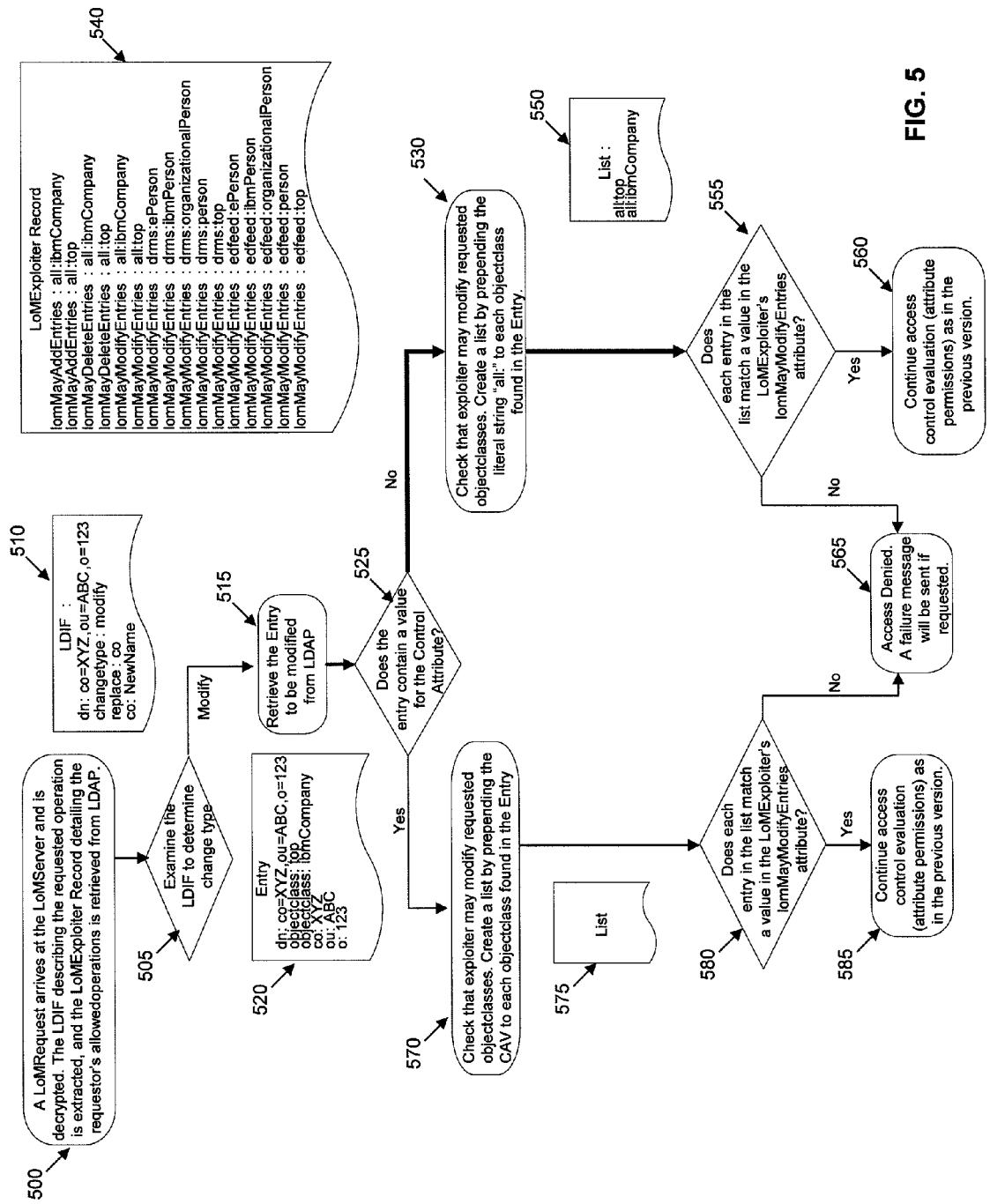
FIG. 5 is a flow chart of steps of an embodiment of the invention.

FIG. 5 is a flow chart of steps of an embodiment of the invention and, in particular, a logic flow for performing modifications to LDIF data. At step 500, a request message arrives at a LoM server and is decrypted. Once decrypted, the LDIF data describing the request type is extracted (shown at box 510) and a LoM Exploiter record detailing the requestor's allowed operations can be retrieved from an LDAP directory. For example, LDIF data (510) may be extracted from a request message and include any number of attributes such as the name of a company and/or information about the company. The LDIF data (510) may also include one or more objectClasses as attributes such as, e.g., ibmPerson, ePerson, top, etc. In addition to containing attributes, the LDIF data (510) may also include a request type, which describes the type of operation requested.

At step 505, the LDIF data can be examined to determine the request type. For illustrative purposes, the request type in FIG. 5 is modify. Once the request type is determined, an entry may be retrieved from an LDAP directory, at step 515, wherein the entry (shown at box 520) is a representation of the LDIF data (510).

In FIG. 5, the request type (or change type) is "modify", which indicates that the requestor has requested that an entry (520), which is a representation of LDIF data (510), be modified. The requested modification described in LDIF data (510) is to replace the company name "XYZ" with the company name "NewName". In order to perform this request type, the entry (520) is retrieved from an LDAP directory.

Once the entry (520) is retrieved from the LDAP directory, a determination is made, at step 525, as to whether the entry (520) includes an entry type. In embodiments, the entry type may also be referred to as a control attribute. If there is no entry type, the word "all:" is prepended to each objectClass in the entry (520). This provides a way for the LoM server to interpret the LoM Exploiter client and provide for backwards compatibility.

In the example of FIG. 5, the entry (520) does not include an entry type, and therefore, the flow continues to step 530. At step 530, a check may be performed to determine whether the LoM Exploiter client may modify the requested objectClasses associated with the entry (520). To perform this determination, a list (shown at box 550) may be created by prepending the literal string "all:" to each objectClass within the entry (520). Therefore, the string "all:" would be prepended to objectClasses "top" and "ibmCompany" to produce the strings "all:top" and "all:ibmCompany", which comprise the list (550).

Once the list (550) is created, it may be compared to strings in the LoM Exploiter record (shown in box 540). In embodiments, this comparison may be performed by prepending an identifier relating to the request type to the entries in the list (550). For example, if a modification is requested, the identifier "LoMMayModifyEntries" may be prepended to "all:top" and "all:ibmCompany" to produce the strings "LoMMayModifyEntries:all:top" and "LoMMayModifyEntries:all:ibmCompany". These stings may be compared against the attributes in the LoM Exploiter record (540) to determine whether the LoM Exploiter client has permission to make the requested modification, at step 555. In making this comparison, as both "LoMMayModifyEntries:all:top" and "LoMMayModifyEntries:all:ibmCompany" are in the LoM Exploiter record (540), the client has permission to modify the entry (520). Since permissions exist, access control evaluation is continued, at step 560. The access control evaluation continues as is shown in FIGS. 1-3. Thus, the modification requested in the LDIF data (510) is applied to the entry (520), and a reply message is sent to a LoM Exploiter reply queue and then to the LoM Exploiter client.

If permissions do not exist at step 555, i.e., all of the entries in the list (550) are not in the LoM Exploiter record (540), then access will be denied, at step 565. In addition to denying access, in embodiments, the LoM server will send a failure message to the LoM Exploiter reply queue, which sends the failure message to the LoM Exploiter client.

While FIG. 5 illustrates a non-typed entry, it should be understood that similar steps may be performed when a typed entry is present. For example, at step 525, if the determination is positive, the process continues to step 570. At step 570, a check may be performed to determine whether the LoM Exploiter client may modify the entry (520). This may be performed by creating a list (shown at box 575) by prepending an entry type value to the objectClasses in the entry (520). However, instead of prepending the string "all:" to the objectClasses, the actual entry type value is prepended to the objectClasses, at step 570. A comparison between the strings in the list (575) and those found in the LoM Exploiter record (540) may be performed, at step 580, and access can be granted, at step 585, if all of the strings in the list (575) is found in the LoM Exploiter record (540). However, if one or more of the strings in the list (575) are not found in the LoM Exploiter record (540), access may be denied at step 565. If access is granted, the modification may be performed and a reply message may be sent to a LoM Exploiter reply queue and then sent to the LoM Exploiter client. If access is denied, a failure message may be sent to the LoM Exploiter reply queue and then to the LoM Exploiter client.

Exemplary Addition

Figure 6:
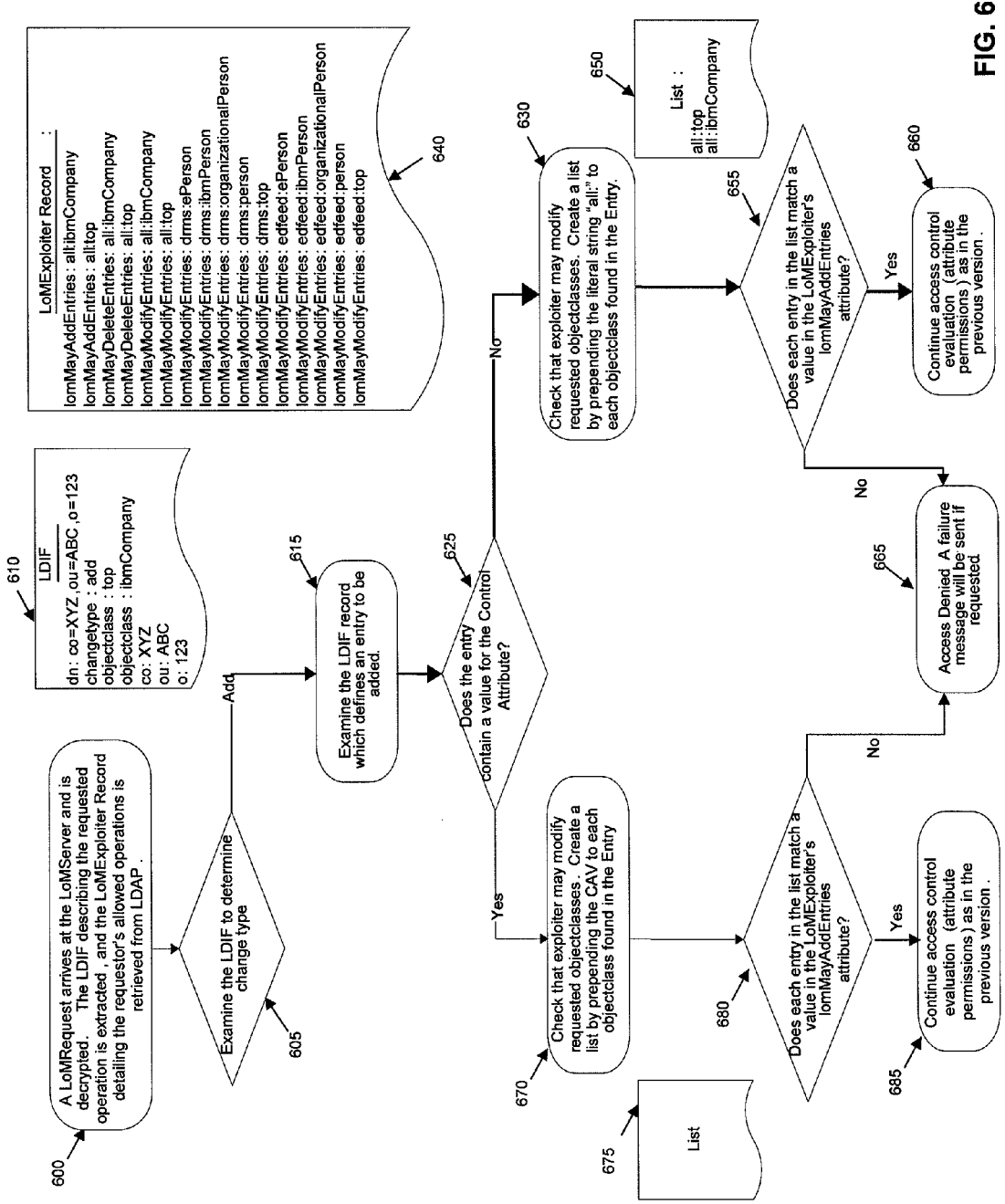
FIG. 6 is a flow chart of steps of an embodiment of the invention.

FIG. 6 illustrates a flow chart of steps of an embodiment of the invention and, in particular, a logic flow for adding LDIF data. At step 600, a request message arrives at a LoM server and is decrypted. Once decrypted, the LDIF data describing the request type is extracted (shown at box 610) and a LoM Exploiter record, which details the requestor's allowed operations, can be retrieved from the LDAP directory. For example, LDIF data (610) may be extracted from a request message and include a number of attributes. The LDIF data (610) may also include a request type, which describes the type of operation requested.

At step 605, the LDIF data (610) can be examined to determine the request type. In FIG. 6, the request type is "add", which indicates that the requester has requested an entry be created and include objectClass attributes "top" and "ibmCompany" as well as attributes relating to the company, such as "XYZ", "ABC", and "123". However, before an entry with this LDIF data may be created, a determination should be made as to whether the client has permission to create the entry.

The LDIF data (610) is examined, at step 615, and a determination is made, at step 625, as to whether the LDIF data (610) includes an entry type. The example of FIG. 6 does not include an entry type, and therefore, the flow continues to step 630, where a check is performed to determine whether the LoM Exploiter client may add the entry as represented by the LDIF data (610). This may be performed by creating a list (shown at box 650) by prepending the string "all:" to each objectClass within the entry. Therefore, the string "all:" would be prepended to objectClasses "top" and "ibmCompany" to produce the strings "all:top" and "all:ibmCompany", which comprise the list (650).

The list (650) may be compared to strings in the LoM Exploiter record (shown at box 640). In embodiments, this comparison may be performed by prepending an identifier relating to the request type to the entries in the list (650). For example, if an add is requested, the identifier "LoMMayAddEntries" may be prepended to "all:top" and "all:ibmCompany" to produce strings "LoMMayAddEntries:all:top" and "LoMMayAddEntries:all:ibmCompany".

At step 655, these stings may be compared against the attributes in the LoM Exploiter record (640) to determine whether the client has permission to add the requested entry. In making this comparison, both "LoMMayAddEntries:all:top" and "LoMMayAddEntries:all:ibmCompany" are in the LoM Exploiter record (640). Therefore, the LoM Exploiter client has permission to add the entry. Since permissions exist, access control evaluation is continued, at step 660. The access control evaluation continues as is shown in FIGS. 1-3. Thus, the addition requested in the LDIF data (610) is created, and a reply message is sent to a LoM Exploiter reply queue and then to the LoM Exploiter client.

If permissions do not exist at step 655, i.e., all of the entries in the list (650) are not in the LoM Exploiter record (640), then access will be denied, at step 665. In addition to denying access, the LoM server will send a failure message to the LoM Exploiter reply queue and then to the LoM Exploiter client.

While FIG. 6 illustrates a non-typed entry, it should be understood that similar steps may be performed when a typed entry is present. For example, at step 625, if the determination is positive, the process continues to step 670. At step 670, a check may be performed to determine whether the LoM Exploiter client may add the entry as represented by the LDIF data (610). This may be performed by creating a list (shown at box 675) by prepending an entry type value to the objectClasses in the entry in the LDIF data (610). However, instead of prepending the string "all:" to the objectClasses, the actual entry type value is prepended to the objectClasses, at step 670. A comparison between the strings in the list (675) and those found in the LoM Exploiter record (640) may be performed, at step 680, and access can be granted, at step 685, if all of the strings in the list (675) are found in the LoM Exploiter record (640). However, if one or more of the strings in the list (675) are not found in the LoM Exploiter record (640), access may be denied at step 665. If access is granted, the addition may be performed and a reply message may be sent to a LoM Exploiter reply queue and then sent to the LoM Exploiter client. If access is denied, a failure message may be sent to the LoM Exploiter reply queue and then to the LoM Exploiter client.

Exemplary Deletion

FIG. 7 is a flow chart of steps of an embodiment of the invention and, in particular, a logic flow for deleting an entry associated with LDIF data. At step 700, a request message arrives at a LoM server and is decrypted. Once decrypted, the LDIF data describing the request type is extracted (see box 710) and a LoM Exploiter record detailing the requestor's allowed operations can be retrieved from a LDAP. For example, LDIF data (710) may be extracted from a request message and include a request type, which describes the type of operation requested.

At step 705, the LDIF data (710) can be examined to determine the request type. Once the request type is determined, an entry (720) may be retrieved, at step 715, from the LDAP directory. In the example of FIG. 7, the request type is "delete", which indicates that the requester has requested that an entry (710) associated with the LDIF data (710) be deleted. The requested deletion described in LDIF data (710) is to delete the entry having attributes "cn=John Smith", "ou=ABC", and "o=123" (shown at box 720). In order to perform this deletion, the entry (720) is retrieved from the LDAP directory.

Once the entry (720) is retrieved from a LDAP, a determination is made, at step 725, as to whether the entry (720) includes an entity type. In FIG. 7, the entry type is represented in the entry (720) as "edfeed". At step 730, a check may be performed to determine whether the LoM Exploiter client may delete the entry (720). To perform this determination, a list (shown at box 750) may be created by prepending the entry type "edfeed:" to each objectClass within the entry (720). Therefore, the string "edfeed:" would be prepended to objectClasses "top", "ePerson", "ibmPerson", "organizationalPerson", and "Person" to produce the strings "edfeed:top", "edfeed:ePerson", "edfeed:ibmPerson", "edfeed:organizationalPerson", and "edfeed:Person", which comprise the list (750).

Once the word "edfeed:" is prepended to the objectClasses in the entry (720), the list (750) may be compared to strings in the LoM Exploiter record (shown at box 740). In embodiments, this comparison may be performed by prepending an identifier relating to the request type to the entries in the list (750). For example, if a modification is requested, the identifier "LoMMayDeleteEntries" may be prepended to the strings "edfeed:top", "edfeed:ePerson", "edfeed:ibmPerson", "edfeed:organizationalPerson", and "edfeed:Person" to produce strings "LoMMayDeleteEntries:edfeed:top", "LoMMayDeleteEntries:edfeed:ePerson", "LoMMayDeleteEntries:edfeed:ibmPerson", "LoMMayDeleteEntries:edfeed:organizationalPerson", and "LoMMayDeleteEntries:edfeed:Person".

These stings may be compared against the attributes in the LoM Exploiter record (740) to determine whether the LoM Exploiter client has permission to make the requested deletion, at step 755. In making this comparison, all of the entries in the list (750) are not in the LoM Exploiter record (740). Therefore, the LoM Exploiter client does not have permission to delete the entry (720). Since permissions do not exist, the deletion requested in the LDIF data (710) is not applied, and a failure message is sent to a LoM Exploiter reply queue and then to the LoM Exploiter client.

If permissions do exist, i.e., all of the entries in the list (750) are in the LoM Exploiter record (740), then access would be granted, at step 760. The access control evaluation is configured to continue as shown in FIGS. 1-3. In addition to granting access, the LoM server would send a reply message to the LoM Exploiter reply queue and then to the LoM Exploiter client.

While FIG. 7 illustrates a typed entry, it should be understood that similar steps may be performed when a non-typed entry is present. For example, at step 725, if the determination is negative, the process continues to step 770. At step 770, a check may be performed to determine whether the LoM Exploiter client may delete the entry (720). This may be performed by creating a list (shown at box 775) by prepending the string "all:" to the objectClasses in the entry (720). A comparison between the strings in the list (775) and those found in the LoM Exploiter record (740) may be performed, at step 780, and access can be granted, at step 785, if all of the strings in the list (775) are found in the LoM Exploiter record (740). However, if one or more of the strings in the list (775) are not found in the LoM Exploiter record (740), access may be denied at step 765. If access is granted, the modification may be performed and a reply message may be sent to a LoM Exploiter reply queue and then sent to the LoM Exploiter client. If access is denied, a failure message may be sent to the LoM Exploiter reply queue and then to the LoM Exploiter client.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of processing requests, the method comprising:
   extracting, by a processor, data from a decrypted client request;
   determining a request type from the extracted data;
   ascertaining an entry type value from at least one of the extracted data and an entry;
   creating at least one string by prepending the entry type value to one or more attributes associated with the entry; and
   comparing the at least one string to one or more record entries to determine whether a client has permission to perform the request type.

2. The method of claim 1, wherein the request type is one of adding, modifying, or deleting.

3. The method of claim 1, wherein the entry type value is typed or non-typed.

4. The method of claim 1, wherein the extracted data is Lightweight Directory Interchange Format (LDIF) data.

5. The method of claim 1, wherein the one or more attributes are objectClasses.

6. The method of claim 1, wherein the entry is a representation of the extracted data.

7. The method of claim 1, further comprising sending a message to the client to inform the client as to whether the client has permission to perform the request type.

8. The method of claim 1, wherein a computer infrastructure that is operable to perform the steps of claim 1 is at least one of supported, deployed, maintained, and created by a service provider.

9. The method of claim 1, wherein the steps of claim 1 are offered by a service provider based on one of a fee and subscription basis.

10. The method of claim 1, wherein the steps of claim 1 are implemented on a combination of software and hardware or hardware.

11. The method of claim 1, further comprising
    determining whether the request type from the data is adding, modifying, or deleting, wherein permission is granted when all of the at least one string are provided in the one or more record entries; and
    sending the message to the client indicating the client has permission to perform the request type.

12. A computer program product comprising a computer usable memory having readable program code embodied in the memory, the computer program product includes at least one component to:
    extract data from a decrypted request;
    determine a change type from the decrypted data;
    retrieve an entry type value;
    determine whether the entry type value is typed or non-typed;
    create at least one string by prepending the entry type value to one or more attributes associated with an entry; and
    compare the at least one string to one or more record entries to check if authorization exists to perform the change type.

13. The computer program product of claim 12, wherein the computer program product is at least one of supported, deployed, maintained, and created by a service provider.

14. The computer program product of claim 12, further comprising at least one component to send a message to a client to inform the client as to whether the client has authorization to perform the change type.

15. A method for deploying an application for processing requests, comprising the computer implemented steps of:
    extracting data from a decrypted client request;
    determining a request type from the extracted data;
    ascertaining an entry type value from at least one of the extracted data and an entry;
    creating at least one string by prepending the entry type value to one or more attributes associated with the entry; and
    comparing the at least one string to one or more record entries to determine whether a client has permission to perform the request type.

16. The method of claim 15, wherein a computer infrastructure that is operable to perform the steps of claim 15 is at least one of supported, deployed, maintained, and created by a service provider.

17. The method of claim 15, wherein the request type is one of adding, modifying, or deleting.

18. The method of claim 15, wherein the entry type value is typed or non-typed.

19. The method of claim 15, wherein the entry is a representation of the extracted data.

20. The method of claim 15, further comprising sending a message to the client to inform the client as to whether the client has permission to perform the request type.

21. The method of claim 1, wherein:
the entry is retrieved from a lightweight directory access protocol (LDAP);
the request type comprises one of adding, deleting, and modifying data of the entry;
the request type is applied to the entry when the client has permission to perform the request type; and
the method further comprises:
creating one or more strings by prepending an identifier associated with the request type to the at least one string; and
comparing the one or more strings to the one or more record entries to determine whether the client has permission to perform the request type.

22. The computer program product of claim 12, wherein:
the entry is retrieved from a lightweight directory access protocol (LDAP);
the change type comprises one of adding, deleting, and modifying data of the entry;
the change type is applied to the entry when authorization exists to perform the change type; and
the at least one component is further operable to:
create one or more strings by prepending an identifier associated with the change type to the at least one string; and
compare the one or more strings to the one or more record entries to determine whether the client has permission to perform the change type.

23. The method of claim 15, wherein:
the entry is retrieved from a lightweight directory access protocol (LDAP);
the request type comprises one of adding, deleting, and modifying data of the entry;
the request type is applied to the entry when the client has permission to perform the request type; and
the method further comprises:
creating one or more strings by prepending an identifier associated with the request type to the at least one string; and
comparing the one or more strings to the one or more record entries to determine whether the client has permission to perform the request type.

24. The method of claim 1, wherein:
the request type is one of adding, modifying, or deleting;
the extracting data further comprises extracting Lightweight Directory Interchange Format (LDIF) data from the decrypted client request, the LDIF data being generated by a client on behalf of a user that lacks authority to update a Lightweight Directory Access Protocol (LDAP) directory;
the LDIF data is associated with the one or more attributes and the request type;
the ascertaining the entry type value from the at least one of the extracted data and the entry further comprises:
retrieving an entry from the LDAP directory, the entry being a representation of the LDIF data; and
determining whether the entry type is typed or non-typed; and
the method further comprises sending a message to the client to inform the client as to whether the client has permission to perform the request type.

* * * * *